United States Patent
Rao et al.

(10) Patent No.: US 11,884,004 B2
(45) Date of Patent: Jan. 30, 2024

(54) SYSTEMS AND METHODS FOR SUPPORT REMOVAL IN STEREOLITHOGRAPHIC ADDITIVE MANUFACTURING

(71) Applicant: Massachusetts Institute of Technology, Cambridge, MA (US)

(72) Inventors: Abhinav Rao, Springfield, OH (US); Anastasios John Hart, Waban, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 0 days.

(21) Appl. No.: 17/278,779

(22) PCT Filed: Nov. 12, 2019

(86) PCT No.: PCT/US2019/060975
§ 371 (c)(1),
(2) Date: Mar. 23, 2021

(87) PCT Pub. No.: WO2020/097620
PCT Pub. Date: May 14, 2020

(65) Prior Publication Data
US 2022/0040915 A1    Feb. 10, 2022

Related U.S. Application Data

(60) Provisional application No. 62/758,492, filed on Nov. 9, 2018.

(51) Int. Cl.
*B29C 64/135* (2017.01)
*B29C 64/268* (2017.01)
(Continued)

(52) U.S. Cl.
CPC .......... *B29C 64/135* (2017.08); *B29C 64/268* (2017.08); *B29C 64/40* (2017.08);
(Continued)

(58) Field of Classification Search
CPC ..... B29C 64/135; B29C 64/268; B29C 64/40; B29C 64/393
See application file for complete search history.

(56) References Cited

U.S. PATENT DOCUMENTS 5,182,056 A * 1/1993 Spence ............... G03F 7/70416
                                                         118/712
2004/0170923 A1   9/2004 Steinmann et al.
(Continued)

OTHER PUBLICATIONS

International Search Report and Written Opinion for Application No. PCT/US2019/060975, dated Jan. 28, 2020 (10 Pages).
(Continued)

*Primary Examiner* — Yunju Kim
(74) *Attorney, Agent, or Firm* — Barnes & Thornburg LLP

(57) ABSTRACT

Systems and methods for making it easier to remove support structures printed in conjunction with printing an object using stereolithographic additive manufacturing are disclosed. In some exemplary embodiments, one or more interfaces between the printed object and the support structures are modulated to allow for easy separation between them, in some instances even when the object and support structures are made from the same material. Various modulation techniques are disclosed, including adjusting an intensity of exposure to light at interfaces between the object and support structures, and using two materials where one material cures at two wavelength ranges and the other material only cures at one of the two wavelength ranges. Other systems and methods that allow for easy separation of part and support structure are also described.

13 Claims, 11 Drawing Sheets

(51) Int. Cl.
    *B29C 64/40* (2017.01)
    *B29C 71/00* (2006.01)
    *B33Y 10/00* (2015.01)
    *B33Y 40/20* (2020.01)
    *B29K 105/00* (2006.01)
    *B29K 105/24* (2006.01)

(52) U.S. Cl.
    CPC .......... *B29C 71/0009* (2013.01); *B33Y 10/00* (2014.12); *B33Y 40/20* (2020.01); *B29K 2105/0002* (2013.01); *B29K 2105/243* (2013.01)

(56) References Cited

U.S. PATENT DOCUMENTS

| | | | | |
|---|---|---|---|---|
| 2014/0303942 A1* | 10/2014 | Wighton | ............... | B29C 64/165 703/1 |
| 2016/0107234 A1* | 4/2016 | Craeghs | ................. | B22F 10/47 264/401 |
| 2018/0001545 A1 | 1/2018 | Ruiz et al. | | |
| 2018/0079141 A1* | 3/2018 | Yoshida | ................. | B29C 64/40 |
| 2018/0251646 A1 | 9/2018 | Rolland et al. | | |
| 2020/0094484 A1* | 3/2020 | Bheda | ................... | B33Y 40/00 |

OTHER PUBLICATIONS

Kaastrup, K., et al. "Using Photo-Initiated Polymerization Reactions to Detect Molecular Recognition." Chem. Soc. Rev. 45, pp. 532-545. 2016.

Li, W., et al. "Printing Continuously Graded Interpenetrating Polymer Networks fo Acrylate/Epoxy by Manipulating Cationic Netowrk Formation During Stereolithography." Express Polym. Lett. 10, pp. 1002-1015. 2016.

* cited by examiner

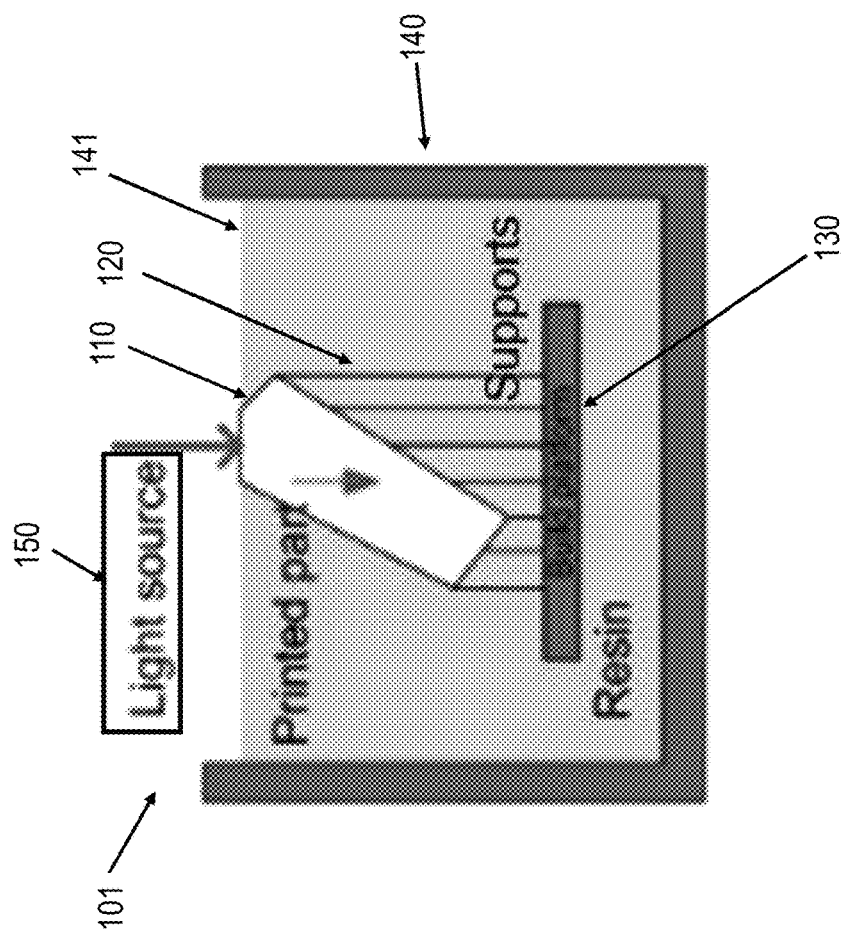
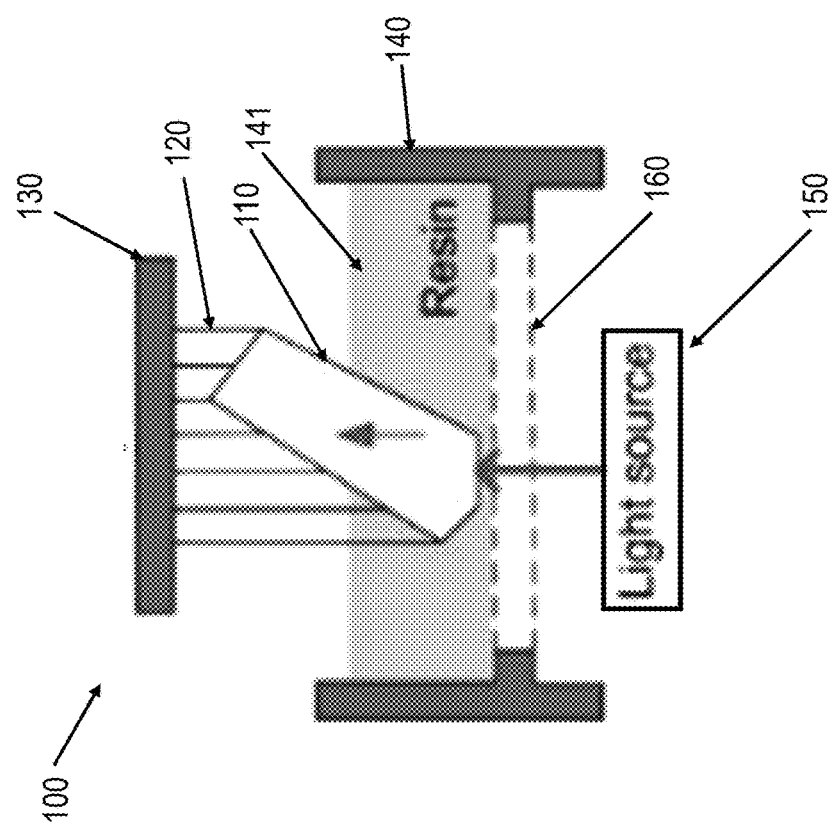
FIG. 1B
FIG. 1A

SYSTEMS AND METHODS FOR SUPPORT REMOVAL IN STEREOLITHOGRAPHIC ADDITIVE MANUFACTURING

RELATED APPLICATIONS

This application is a U.S. national stage filing from International Application Number PCT/US19/60975, filed Nov. 12, 2019, and entitled "Systems and Methods for Support Removal in Stereolithographic Additive Manufacturing," which claims priority to and the benefit of U.S. Provisional Application No. 62/758,492, filed Nov. 9, 2018, and entitled "Systems and Methods for Support Removal in Stereolithographic Additive Manufacturing," the contents of each which is hereby incorporated by reference in their entireties.

FIELD

The present disclosure relates to systems and methods for stereolithographic additive manufacturing, and more particularly relates to systems and methods that allow for printed parts to be more easily separated from support structures that are used to support the printed part during the stereolithographic additive manufacturing.

BACKGROUND

There are many different techniques for performing additive manufacturing. In some techniques, in conjunction with printing a desired object(s), one or more support structures are also printed. The printing of the support structure(s) and object(s) can occur contemporaneously, after which the support structure(s) can be removed to leave the desired printed, three-dimensional object(s). There are many known ways by which support structures can be removed, some of which are more manual and others of which are more automated.

One non-limiting example of an additive manufacturing technique that can use support structures is vat photopolymerization stereolithographic (SLA) additive manufacturing. In vat SLA additive manufacturing, the support structure and part are often composed of the same material. As a result, they can have identical mechanical, chemical, and thermal properties, making automated support removal methods, such as dissolution, unfeasible. Because of this, supports are typically removed manually, which is labor and time-intensive, especially when the supports are difficult to access due to part geometry. In some cases, internal supports may be completely inaccessible and therefore impossible to remove. Additionally, the manual support removal often leaves a residual stub, requiring further steps like sanding and polishing to achieve surface quality required for part functionality. This is a limitation in the widespread adoption of SLA at production scales and full automation.

Accordingly, there is a need for systems and methods that allow for the easier removal of supports from a printed three-dimensional object that was manufactured using additive manufacturing techniques such as SLA, and in particular systems and methods that can allow for automated support removal techniques to be utilized.

SUMMARY

The present application is directed to systems and methods that utilize a support structure(s) in conjunction with printing a three-dimensional object, but do so in a manner that allows the support structure(s) to more easily be separated from the object being printed. Various disclosures about how the interface(s) between the object being printed and the support structure(s) can be formed or otherwise modulated to allow for easy separation, even when printing both the object and the support structure(s) from the same material, are provided. Some non-limiting ways by which the interface(s) can be modulated include: adjusting an intensity of exposure of deposited material to a light source; adjusting a spatial distribution of light exposure for the interface(s); forming a notched geometry at the interface(s); modulating properties of a plurality of interfaces in a manner that directs a separation path to be followed when separating the object from the support structure(s); modifying an exposure to a light source at one or more locations proximate to or at the interface(s) to reduce at least one of a fracture strength or a ductility of material of at least one of the one or more locations proximate to or at the interface(s); modifying print instructions for forming the interface(s) to change one or more mechanical properties of the material within the one or more layers relative to properties achieved by forming the desired three-dimensional object and the support structure; using two different materials, with one being responsive to a free-radical photoinitiator and the other being responsive to a cationic photoinitiator; using two different materials, with one having a higher resistance to swelling; and using two different materials, with one material being configured to at least partially cure at a different wavelength than the other (e.g., both at least partially cure in response to a green light, but only one at least partially cures in response to an ultraviolet light).

In one exemplary embodiment of a method for manufacturing a three-dimensional object, the method includes depositing a photopolymerizable material to form a desired three-dimensional object and to form a support structure configured to support the desired three-dimensional object. The deposited material forms one or more interfaces between the desired three-dimensional object and the support structure, with the one or more interfaces being one or more locations at which the desired three-dimensional object is configured to be separated from the support structure. The method further includes modulating properties of the one or more interfaces such that an application of a threshold force proximate to or at the one or more interfaces allows the desired three-dimensional object to be separated from the support structure. A value of the threshold force is less than a value of a fracture force at which the desired three-dimensional object fracture. Still further, the method includes at least partially curing at least a portion of the deposited material using a light source, and separating the desired three-dimensional object from the support structure at the one or more interfaces. In at least some embodiments, modulating properties of the one or more interfaces includes adjusting an intensity of exposure of the deposited material to the light source proximate to or at the one or more interfaces.

Adjusting an intensity of exposure of the deposited material to the light source can result in a strength of the deposited material at or adjacent to the one or more interfaces being weaker than a strength of the deposited material that forms the desired three-dimensional object. Alternatively, or additionally, adjusting an intensity of exposure of the deposited material to the light source at the one or more interfaces can occur relative to the intensity used to form the desired three-dimensional object and the support structure. The light source can be one or more LEDs and/or one or more lasers, and adjusting an intensity of exposure to a light source at the one or more interfaces can include adjusting a fluence of the one or more LEDs and/or lasers. The fluence of the light source (e.g., LED(s), laser(s)) can include a total energy of the light source (e.g., LED(s), laser(s)) and a duration of exposure to the light source (e.g., LED(s), laser(s)).

The present disclosure provides for a variety of ways by which properties of the one or more interfaces can be modulated. For example, modulating properties of the one or more interfaces can include adjusting a spatial distribution of light exposure for the one or more interfaces. In some such embodiments, adjusting a spatial distribution of light exposure for the one or more interfaces can include adjusting a scan pattern of the light source at one or more interfaces. Adjusting a scan pattern can include changing from a first scan pattern to a second scan pattern, with each of the first and second scan patterns being one of a cross-hatching pattern scan, a vector scan, or a sequential line-by-line scan. By way of further example, modulating properties of the one or more interfaces can include forming a notched geometry at one or more of the one or more interfaces, the notched geometry being configured to promote separation between the desired three-dimensional object and the support structure. By way of even a further example, modulating properties of the one or more interfaces can include modulating properties of a plurality of the one or more interfaces in a manner that directs a separation path to be followed when separating the desired three-dimensional object from the support structure. In such instances, separating the desired three-dimensional object from the support structure can include separating the desired three-dimensional object from the support structure along the separation path.

In at least some embodiments, the action of at least partially curing at least a portion of the deposited material using a light source is performed prior to separating the desired three-dimensional object from the support structure at the one or more interfaces. In at least some embodiments, the action of separating the desired three-dimensional object from the support structure at the one or more interfaces is performed prior to the deposited material that forms the desired three-dimensional object is fully cured.

In view of the present disclosures, and the claimed method, the action of separating the desired three-dimensional object from the support structure at the one or more interfaces can be performed without the assistance of a separation tool to separate the desired three-dimensional object from the support structure. As provided for herein, a support structure can be a single structure, or it can be a combination of support structures. The deposited material that forms the desired three-dimensional object, the support structure, and the one or more interfaces can be the same material for each of the desired three-dimensional object, the support structure, and the one or more interfaces.

The method can further include obtaining a design for a three-dimensional geometry to form the desired three-dimensional object, generating a design for the support structure based on the design for the three-dimensional geometry, and generating a scan pattern to build the designed support structure. The scan pattern can be used, for example, to build the support structure on a layer-by-layer basis. Modulating properties of the one or more interfaces can include modifying an exposure to a light source at one or more locations proximate to or at the one or more interfaces to reduce at least one of a fracture strength of a ductility of material of at least one of the one or more locations proximate to or at the one or more interfaces.

The method can further include adding one or more layers of digital data for the one or more locations proximate to or at the one or more interfaces. In some such instances, the action of modulating properties of the one or more interfaces can include modifying print instructions for the forming the one or more interfaces to change one or more mechanical properties of the material within the one or more layers relative to properties achieved by forming the desired three-dimensional object and the support structure.

In another exemplary embodiment of a method for manufacturing a three-dimensional object, the method includes depositing material to form a desired three-dimensional object and to form a support structure configured to support the desired three-dimensional object, with the desired three-dimensional object being formed from a first material and at least one of the support structure or one or more interfaces between the desired three-dimensional object and the support structure being formed from a second material. The one or more interfaces are one or more locations at which the desired three-dimensional object is configured to be separated from the support structure. One of the first material and the second material is configured to be at least partially cured in response to light in a first wavelength range and in response to light in a second wavelength range that is different than the first wavelength range, and the other of the first material and the second material is configured to be at least partially cured in response to light in the first wavelength range but not in response to light in the second wavelength range. The method further includes applying light to the deposited material in the second wavelength range such that at least a portion of one of the first material and the second material at least partially cures while the other of the first and the second material does not cure. Still further, the method includes subsequently applying light to the deposited material in the first wavelength range such that each of the first material and the second material at least partially cures, and separating the desired three-dimensional object from the support structure.

In some embodiments, the one of the first material and the second material that at least partially cures in response to applying light to the deposited material in the second wavelength can be responsive to a free-radical photoinitiator. In some such embodiments, the one of the first material and the second material that at least partially cures in response to applying light to the deposited material in the second wavelength can include at least one of a methacrylate oligomer or a methacrylate monomer that at least partially cures in response to the free-radical photoinitiator. In some embodiments in which one of the first and second materials is responsive to a free-radical photoinitiator, the one of the first material and the second material that at least partially cures in response to applying light to the deposited material in the first wavelength can be responsive to a cationic photoinitiator. The one of the first material and the second material that at least partially cures in response to applying light to the deposited material in the first wavelength can include an epoxide monomer that at least partially cures in response to the cationic photoinitiator. A ratio of the cationic photoinitiator to the free-radical photoinitiator can be approximately in the range of about ten percent to about fifty percent.

The action of separating the desired three-dimensional object from the support structure can include immersing the deposited material in solvent to allow selective swelling of the deposited material based on which portions comprise the first material and which portions comprise the second material. Selective swelling can be such that one of the first material and the second material swells more than the other of the first material and the second material. For example, one of the first material and the second material can have a higher resistance to swelling than the other of the first material and the second material.

The action of depositing material to form a desired three-dimensional object and to form a support structure configured to support the desired three-dimensional object can include depositing a resin that includes both the first material and the second material. In some such embodiments, a volume fraction of one of the first material and the second material in at least one of the desired three-dimensional object or the support structure can be approximately in the range of about 50 percent to about 90 percent.

In some embodiments, the first wavelength range can be approximately in the range of about 495 nanometers to about 570 nanometers, and is thus green light. In some such embodiments, the second wavelength range can be approximately in the range of about 280 nanometers to about 400 nanometers, and is thus ultraviolet light. The action of subsequently applying light to the deposited material in the first wavelength range can further include applying light to the deposited material in each of the first wavelength range (e.g., approximately in the range of about 495 nanometers to about 570 nanometers) and the second wavelength range (e.g., approximately in the range of about 280 nanometers to about 400 nanometers).

A temperature of the deposited material and a temperature of an area surrounding the deposited material can be maintained at an approximate constant temperature when applying light to the deposited material in each of the first and second wavelength ranges. As provided for herein, a support structure can be a single structure, or it can be a combination of support structures.

BRIEF DESCRIPTION OF DRAWINGS

This disclosure will be more fully understood from the following detailed description taken in conjunction with the accompanying drawings, in which:

FIG. 1A is a schematic, cross-sectional side view of one exemplary embodiment of an inverted SLA printer assembly, illustrating an object being printed and support structure;

FIG. 1B is a schematic, cross-sectional side view of an exemplary embodiment of an upright SLA printer assembly, illustrating an object being printed and support structure;

DETAILED DESCRIPTION

Figure 2B:
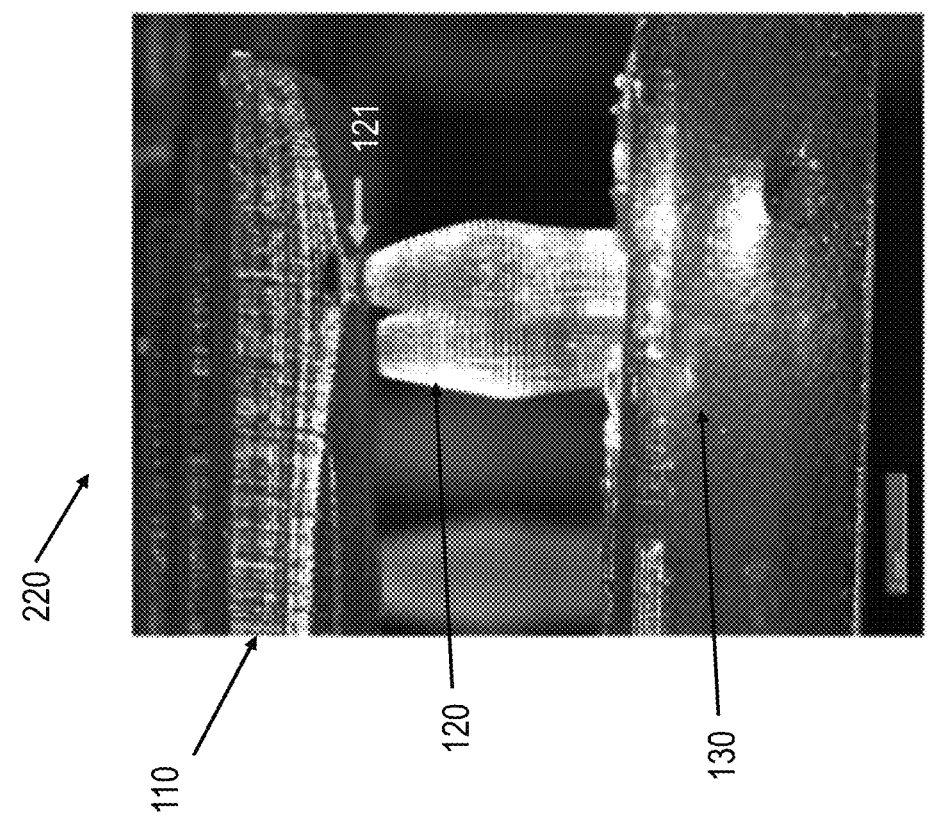
FIG. 2B is a photograph showing another design of support attachment points created by an SLA printer.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, the present disclosure includes some illustrations and descriptions that include prototypes or bench models. A person skilled in the art will recognize how to rely upon the present disclosure to integrate the techniques, systems, devices, and methods provided for into a product, such as a consumer-ready, factory-ready, or lab-ready three-dimensional printer.

Stereolithography (SLA) is an attractive additive manufacturing process because it enables high resolution, fine details, and a large material library. FIG. 1A shows a schematic of an SLA printer 100 in an inverted configuration, and FIG. 1B shows an SLA printer 101 in an upright configuration. In either case, SLA printers can include a tank 140 of photopolymer resin 141, a light source 150, such as one or more LEDs, lasers (e.g., a scanning laser), or digital light projector, and a vertically translating build platform 130 onto which the resin 141 is cured layer-by-layer. The printers 100, 101 can be operated to print a part 110, as well as a support structure 120, the latter of which can be produced in conjunction with printing the part 110 to manage overhangs, thin features, and allow optimal orientation of the part 110, among other benefits. Other benefits include, for example, serving to prevent the part 110, or a section of a part, from breaking off the build platform 130 due to outside forces (e.g., forces from recoating) or, in inverted printers 110, separation of the part 110 from the build window 160 (through which light from the light source 150 is projected, as shown in FIG. 1A).

Unavoidably, the part 110 and the support 120 structure are printed from the same resin 141, and therefore have identical properties. Additionally, the 3D crosslinked polymer network formed while printing fuses the supports 120 to the part 110 in the same manner as each layer of the part 110 is fused to adjacent layers. Thus, the supports 120 have identical mechanical, chemical, and thermal properties compared to the part 110. As a result, support removal is a labor intensive, delicate manual process involving clipping the support-part attachment points with hand tools while avoiding damage to the part 110. Additionally, the manual support 120 removal often leaves a residual stub, requiring further steps like sanding and polishing to improve surface quality. This is a limitation in the widespread adoption of SLA at production scales and full automation. Therefore, a method to enable automatic support removal on prints from single-resin vat are desirable.

Figure 2A:
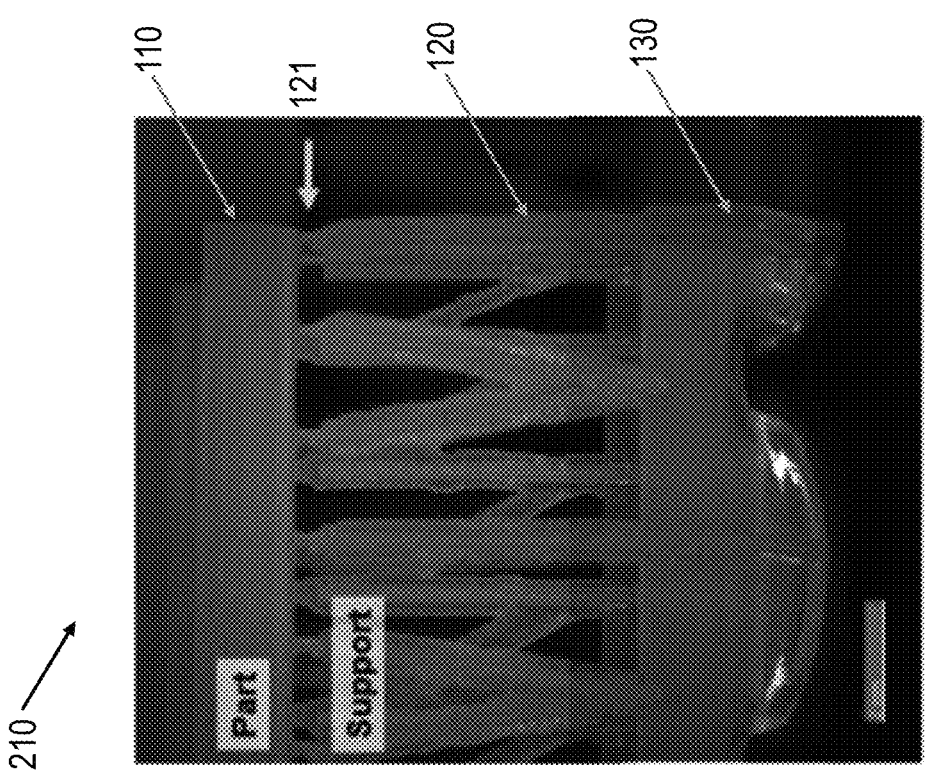
FIG. 2A is a photograph showing a design of support attachment points created by an SLA printer.

Current approaches to support removal rely on minimizing the support-part attachment point to enable easier break-away of the supports. For example, the supports can taper in diameter before they attach to the part, as shown in FIGS. 2A and 2B. FIG. 2A is a photograph 210 of the design of tapered support attachment points 121 between a part 110 and the support 120 as printed on a 3D Systems printer. FIG. 2B is a photograph 220 of the design of tapered support attachment points 121 between the part 110 and the supports 120 as printed on Formlabs Form 2 desktop SLA printer, available through Formlabs Inc. of Somerville, Mass.

Certain embodiments of the present disclosure provide methods to enable easier support removal in single-resin SLA printers using the following broad approaches. Example embodiments include two strategies to enable simplified support 120 removal by: (1) locally modulating the material strength at the support-part interface 121 and, (2) locally modulating the solvent resistance of the support-part interface 121. These methods are readily adaptable to commercial SLA printers and provide a route towards fully automated post-processing of SLA printed parts without skilled manual labor required for support removal. Further, the present techniques allow for the same material to be used to form the part 110, the support 120, and the interfaces 121 when performing the SLA printing.

Figures 3, 4:
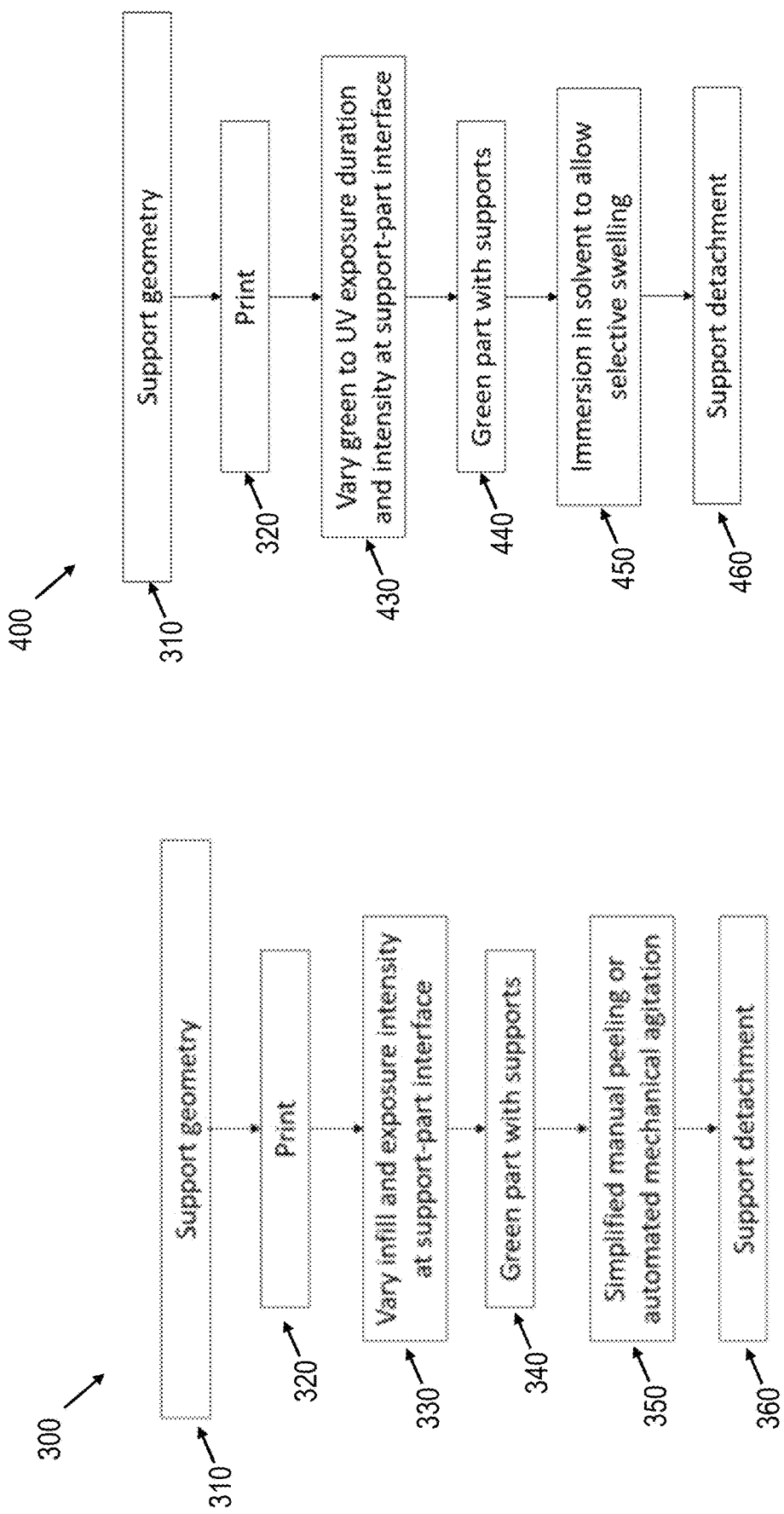
FIG. 3 is a flowchart illustrating one exemplary embodiment of a technique for support removal that includes locally modulating material strength at a support-part interface.
FIG. 4 is a flowchart illustrating another exemplary embodiment of a technique for support removal that includes differing a solvent resistance using a dual-wavelength cure approach.

FIG. 3 is a flow chart example of one exemplary method provided for herein that includes locally modulating the material strength at the support-part interface 121. In a first step 310, the support 120 geometry is defined for use in an SLA printing process for making a part 110, followed by the step 320 of SLA printing the part 110. A person skilled in the art will appreciate the various ways by which printing can be performed, including various SLA techniques. A detailed explanation about the many ways by which objects or parts and support(s) are printed is unnecessary as a result. In some instances, the manufacturing of the object can include depositing material to form a desired three-dimensional object and to form a support structure that is configured to support the desired three-dimensional object. One or more interfaces are formed between the object and the support structure(s), with the interface(s) being configured to be at a location(s) at which the object is configured to be separated from the support structure(s), as described in greater detail below.

During the printing of the material at the support-part interface 121, or as a subsequent step, a step 330 is done to vary the infill exposure intensity at the interface 121 to locally modulating the material strength at the support-part interface 121. The completion 340 of the printing process results in a part 110 that is complete but "green" because the supports 120 are still attached. A subsequent step 350 includes manually peeling or automatic mechanical agitation to remove remaining resin 141 from the exterior surfaces. Finally, at step 360, the supports 120 are detached from the part 110, with the detachment being aided by the favorable break-away of the support 120 from the part 110 at the interface 121.

FIG. 4 is a flow chart example of an exemplary method provided for herein that includes locally modulating the solvent resistance of the support-part interface 121. In a first step 310, the support 120 geometry is defined for use in an SLA printing process for making a part 110, followed by the step 320 of SLA printing the part 110. In this instance, a resin configured to be responsive to a dual-core process is used, discussed in greater detail below. During the printing of the material at the support-part interface 121, or as a subsequent step, a step 430 is done to separately vary a green light and UV light exposure duration and intensity at the interface 121 to locally modulate the solvent resistance of the support-part interface 121. The completion 440 of the printing process results in a part 110 that is complete but "green" because the supports 120 are still attached. A subsequent step 450 includes immersing the part 110 and supports 120 in a solvent to allow selective modulation of the material properties (e.g., by swelling) of the interface 121. Finally, at step 460, the supports 120 are detached from the part 110, with the detachment being aided by the favorable break-away of the support 120 from the part 110 at the interface 121.

In some embodiments, prior to printing, a print plan can be formulated and/or received. The print plan can be a design of the part 110 to be printed, and thus can include a three-dimensional geometry that will be used to form the three-dimensional part 110. The print plan can include one or more pre-designed supports 120 and/or interfaces 121. Alternatively, or additionally, the print plan can generate a design for such supports 120 and/or interfaces 121 based on the three-dimensional geometry. Optimization can be built into the print plan to determine the best locations and amount of supports 120 and/or interfaces 121 for the three-dimensional geometry provided. The optimization can be performed using software, artificial intelligence, and/or other ways by which a processor can operated to generate such plans.

Further optimization can be provided by generating a scan pattern to build the designed supports 120 and/or interfaces 121 with respect to the desired part 110. The scan pattern can allow for the part 110, the supports 120, and the interfaces 121 to be manufactured on a layer-by-layer basis. The print plan can also include instructions related to modulating the support-part interfaces 121, as elaborated upon below. As will be more clear after reading the modulation sections, the print plan can include instructions regarding how to modify exposure to a light source at one or more locations proximate to or at the interface(s) 121 to reduce a fracture strength and/or a ductility of material at the location(s) proximate to or at the interface(s) 121.

Print plans can also be modified during the printing process. For example, one or more layers of digital data for the location(s) proximate to or at the interface(s) 121 can be added. In such instances, the print instructions for forming the interface(s) 121 can be modified to change one or more mechanical properties of the material within the one or more layers relative to properties achieved by forming the part 110 and the support 120.

Modulating Material Strength at the Support-Part Interface

The present disclosure provides for various ways by which the printing can be performed in a manner that allows for easy removal or separation of the support 120 from the part 110. For example, properties of the interface(s) 121 where the part 110 and support 120 can be modulated in a manner that allows for a threshold force to be applied proximate to or at the interface(s) to separate the part 110 and the support 120. The value of the threshold force can be less than a value of a fracture force, the fracture force being a force at which the part 110 fractures. Stated another way, a fracture strength of the interface(s) 121 is typically lower than the yield strength of the part 110. Various ways by which the interface(s) 121 can be modulated impact the values of the facture and threshold forces, as well as properties of the material(s) (e.g., resin) itself. As provided for herein, the material can be a photopolymerizable material.

In some embodiments, removal of the support 120 can be aided by modulating the cure at the support-part interface 121 between the support 120 and the part 110. Curing can be performed using a light source, and the cure can be a partial cure, meaning at least a portion of the material cures, or a full cure, meaning the portion being cured reaches a point at which a reaction rate, as measured by a change in material properties, is negligible. A person skilled in the art, in view of the present disclosures, will understand what constitutes partial and full cures in the context of the formation of the part 110, support 120, and interface(s) 121 disclosed herein. FIG. 5A shows the cross-section of the support post 120 and three cross-section views 510, 511, 512 of the support-part interface 121, each having a different infill pattern that can be used after printing the perimeter of the support post 120. The interface 121 can be defined as one or more layers, at the uppermost region of the support 120, including the layer that is immediately below the lowermost surface of the part 110. Examples of locally modulating the material strength at the support-part interface 121 (e.g., step 330) include modulating the cure parameters at the support-part attachment points (e.g., the support-part interface 121) to reduce the yield stress and tensile strength of the attachment, relative to the nominally cured part 110.

The timing and order of when the curing occurs with respect to other steps can vary. For example, in some instances, curing (e.g., at least partially) can occur prior to separating the part 110 from the support 120. Alternatively, or additionally, separating the part 110 from the support 120 can occur prior to the deposited material that forms the part 110 becoming fully cured. The total exposure at the support-part interface 121 can be lowered in intensity to lower the crosslink density relative to the part 110. This can result in a lower modulus and fracture strength. Additionally, the dosage of the exposure can be regulated to maximize the build-up of polymerization stress at the interface 121, enabling fracture at a lower force than the yield strength of the part 110.

Another way by which the properties of the interface(s) 121 can be modulated is by adjusting a spatial distribution of light exposure of the interface(s) 121. This can include, for example, adjusting a scan pattern of the light source(s) at the interface(s) 121. Exemplary scanning patterns include but are not limited to those illustrated in FIG. 5A: a cross-hatching pattern scan, a vector scan, or a sequential line-by-line scan. The scanning patterns can be changed from one pattern to another during the printing process.

As shown, the cross-sections 510, 511, 512 of a tapered support 120 at the support-part interface 121 can comprise a perimeter scan 520 and an infill scan 530a, 530b, 530c to cure the cross-section 510, 511, 512. The effective strength of the support-part interface 121 can be adjusted by changing the local intensity on the infill scan 530a, 530b, 530c, thereby changing the degree of cure at the support-part interface 121. Additionally, residual polymerization stress can be generated at the support-part interface 121 by changing the scan pattern from a standard cross-hatching pattern to a vector scan or a sequential line-by-line scan, further reducing the strength of the support-part attachment at the support-part interface 121. In some examples, the power of the laser and the scan patterns can be adjusted at the support-part interface 121 to alter the degree and rate of cure to selectively lower the tensile strength of the interface 121, or to increase the tensile strength while decreasing the ductility. The support 120 can subsequently be removed prior to postcuring of the part 110, outside of the printers 100, 101. The present disclosure provides for a variety of ways by which the part 110 can be separated from the support 120.

Figure 5B:
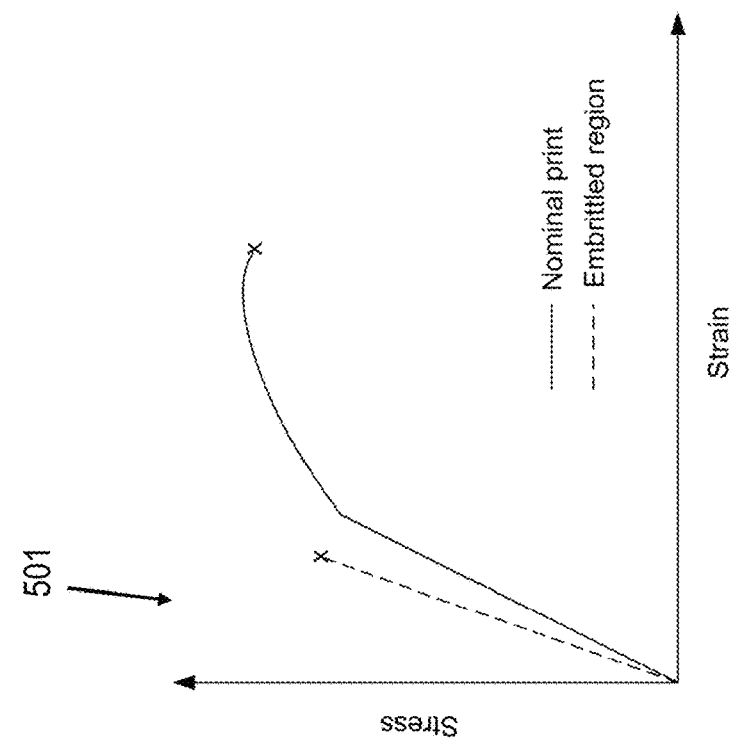
FIG. 5B is a graph of stress versus strain for a printed SLA material illustrating a nominally printed region and an embrittled region according to embodiments of the present disclosure.
Figure 5A:
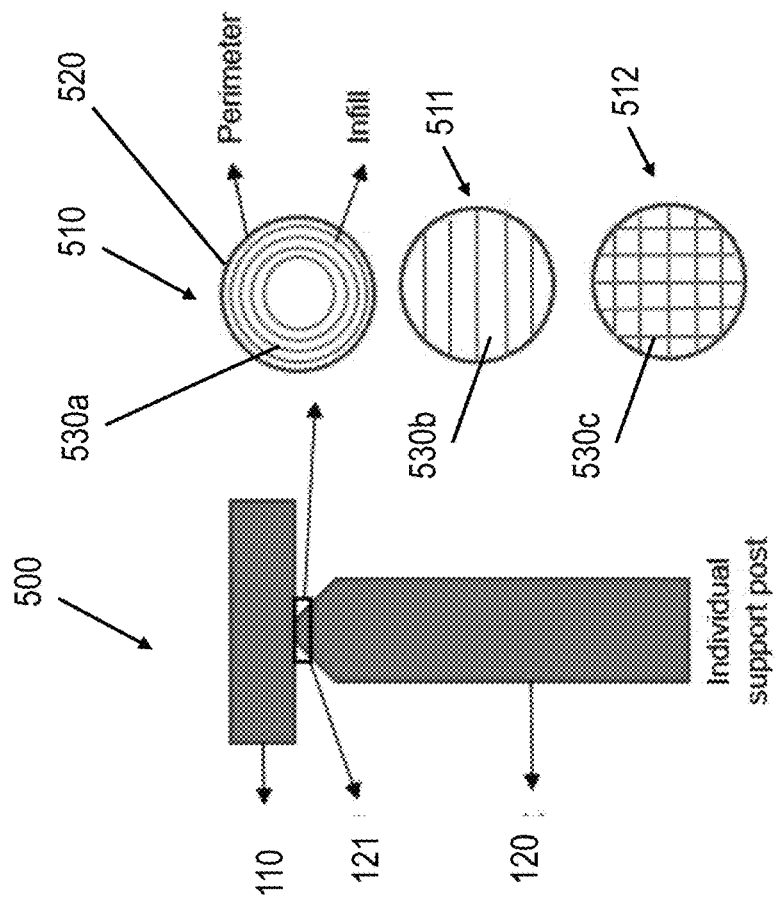
FIG. 5A is a schematic, cross-sectional side view of one exemplary embodiment of a printed object and support structure printed using exemplary systems and methods provided for herein, and more particularly illustrating different infill construction techniques that can be used at a support-part interface.

FIG. 5B is a stress vs. strain graph 501 illustrating the difference in mechanical behavior of a nominally printed region (e.g., the part 110) and an embrittled region (e.g., a support attachment point 121 with a modulated material strength). FIG. 5B shows the embrittled region having a lower ultimate tensile stress than the nominally printed region, which therefore does not exhibit the ductility of the nominally printed region, thus resulting in a lower failure strain (e.g., lower breakaway force).

Specific examples of locally modulating the material strength can include controlling the scan pattern and/or intensity of exposure at the support-part interface 121 to modulate the tensile strength and fracture toughness in the supports 120 for a few layers immediately adjacent to the part 110. In instances in which local modulation includes adjusting an intensity of exposure of the deposited material to a light source, the modulation can occur proximate to or at the one or more support-part interfaces 121. How the intensity is adjusted can depend, at least in part, on the light source being used. For example, when the light is one or more LEDs and/or lasers, the intensity adjustment can be made by adjusting a fluence of the LED(s) and/or laser(s), the fluence including a total energy of the LED(s) and/or laser(s) and a duration of exposure to the LED(s) and/or laser(s). The modulation can occur relative to the intensity used to form the part 110 and the support 120. In some examples, the geometry of the support-part interface 121 can be designed to direct the path of fracture, in combination with modulation of the exposure during scanning at the interface. For instance, modulation of the properties of multiple interfaces 121 can be conducted in a manner such that it directs a separation path that can be followed when separating the part 110 from the support 120. The modulated strength in the support-part interface 121 can be lower than the part 110 and the rest of the support structure 120, and the lowered tensile strength can enable the support 120 to breakaway from the part 110 at lower forces, manually or by automated methods, such as using a robotic manipulator or vibrational source. Because lower forces are needed to separate the part 110 from the support 120 (as described above, the threshold force needed to separate the part 110 from the support 120 is less than the fracture force of the part 110), the separation can be performed without the assistance of a separation tool, a separation tool being a tool that is not operated manually by a user at each interface and/or a tool that actively applies force directly at the interface 121 to cause separation between the part 110 and the support 120. In the context of the present disclosure, a robotic manipulator or vibrational source would not be considered a separation tool at least because a force imparted by such tools are not typically designed to actively apply a force directly to the interface 121. The present disclosure permits automated separation that is not specific to any part. When a separation path is utilized, the separation can occur along the separation path.

Figure 6:
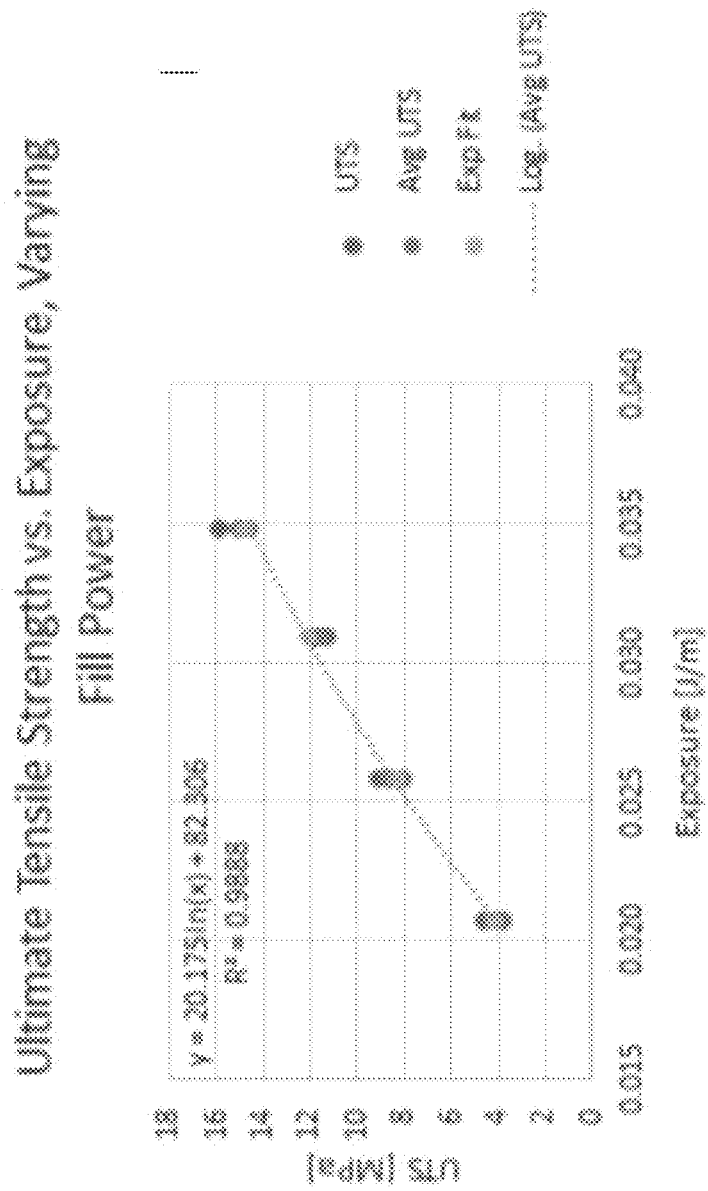
FIG. 6 is a graph of ultimate tensile strength versus exposure intensity for a standard infill pattern.

FIG. 6 shows the effect of reducing the cure intensity for a standard support infill. The reduced cure intensity effectively reduces the contact area that is fully cured resulting in lowered tensile strength, and the data of FIG. 6 was collected by tensile testing of a specimen consisting of a single support post. These results are limited by the fact that the cure depth was not carefully controlled to prevent unwanted curing of the support attachment as the first part layer is cured. With further optimization, and the variation of infill, further reductions in tensile strength are possible. These strategies include, for example, creating a notched geometry at the support-part interface 121 to promote fracture. One advantage of this method is that is can be readily adapted to any photoresin and SLA printer in which the exposure pattern and intensity can be controlled.

Modulating Solvent Resistance of the Support-Part Interface

While some of the methods provided for herein allow for the same material to be used to form each of the desired object or part being printed, the support structure to support the object/part, and the interface(s) between the object or part and the support structure, in other embodiments it can be desirable to use two or more materials to print an object while still allowing for easier separation between the object being printed and the support for that object used while printing. For example, the object being printed cam be formed from a first material and the support and/or the interface(s) can be formed from a second material, with at least one of the first material and the second material being able to be at least partially cured in response to both light in a first wavelength range and light in a second wavelength range, the second wavelength range being different than the first wavelength range, and the other of the first material and the second material being able to be at least partially cured in response to light in one of the wavelength ranges but not in response to light in the other wavelength range. As provided for herein, the material(s) can be photopolymerizable material(s).

In use, light having a first wavelength range can be applied by a light source (e.g., an LED(s), a laser(s), a digital light projector(s)) to the first and second deposited materials. In response, at least a portion of one of the two materials can at least partially cure while the other does not cure. Light having a second wavelength range can be subsequently applied by the same or a different light source to the first and second deposited materials. In response, at least a portion both of the two materials cures. The part can be subsequently detached or otherwise separated from the support.

One example dual cure approach to selectively lower solvent resistance of the support-part attachments 121 uses a resin that includes two separate monomer and photoinitiator systems. Interpenetrating polymer networks, in which the degree of cure of the two components can be varied, can have tunable mechanical properties. However, previous methods have relied on "dark-curing," whereby the curing of one network proceeds in dark conditions after a short initial exposure. This method results in time-scales that are impractically long for SLA printing. The present disclosure includes dual-wavelength embodiments in which the free-radical initiator can be controlled independently using light (e.g., green light, a wavelength at which the cationic initiator displays no activity). This can allow independent adjustment of the local degrees of cure of the two networks.

Examples of locally modulating the solvent resistance of the support-part interface 121 (e.g., step 430) include forming an interpenetrating polymer network (IPN) that includes methacrylate and epoxide polymers, formulated so that the degree of cure of each monomer can be controlled independently by using green and UV light. The relative degrees of cure of the two networks can determine the resistance of the IPN to swelling upon immersion in a liquid, such as carbon tetrachloride. Support removal can be aided by printing the support 120 to have low swelling resistance, while the cured material of the part 110 can have a high solvent resistance. Immersing the printed part 110 and supports 120 in carbon tetrachloride can result in disintegration or highly reduced mechanical integrity of the supports 120, and/or of the support-part interface 121, without comprising the structure of the part 110.

Specific examples of locally modulating the solvent resistance can include using two photoinitiators to independently cure two different monomers, forming the IPN. The degree of cure of each component of the network can be controlled separately based, at least in part, on the wavelength of light used: green (e.g., approximately 520 nm) or UV-AB (e.g., approximately in the range of about 280 nm to about 400 nm). Based on the local ratio of the UV to green exposure, the relative degrees of cure of the two networks can be adjusted. This, in turn, can result in locally varying solvent resistance at, for example, the support-part interface 121.

Figure 7C:
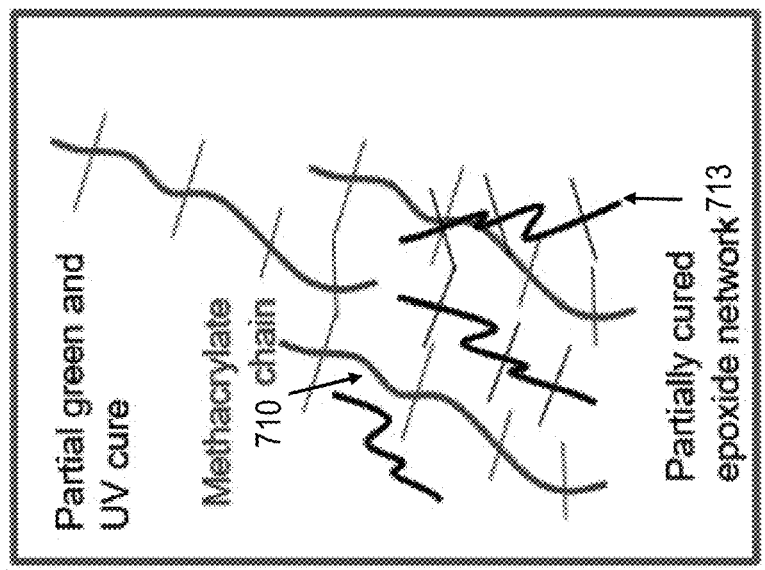
FIGS. 7A-7C are schematic illustrations of the formation of an interpenetrating polymer network with independent control of a radical photoinitator according to dual-cure methods provided for herein.
Figure 7B:
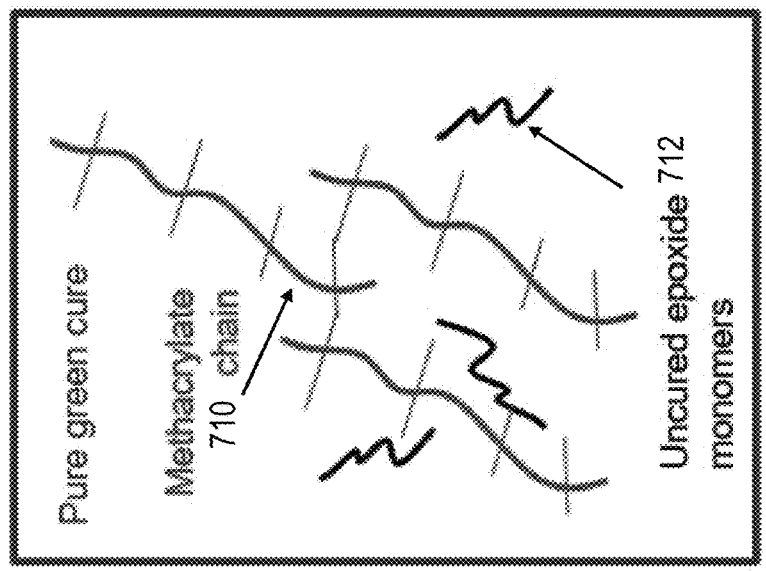
Figure 7A:
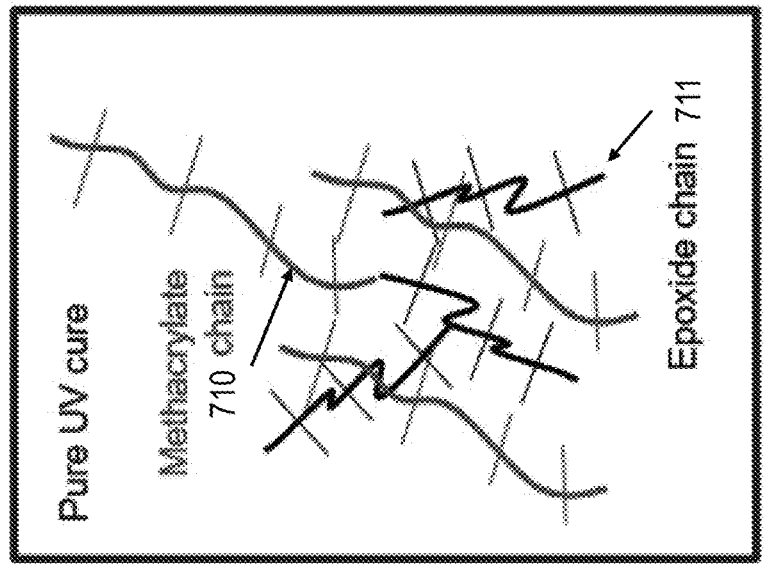

FIGS. 7A-7C are schematics illustrating examples of the dual wavelength approach showing representations of the material structure of an SLA printed material using dual-resins (e.g., a methacrylate resin and an epoxide resin) according to examples of the present disclosure. Under UV light, both a methacrylate network 710 and an epoxide network 711 can be fully cured in the material, as illustrated in FIG. 7A. However, under green light, only the methacrylate network 710 can be cured, as shown in FIG. 7B, and the epoxide monomers 712 can remain uncured. A partial green and UV cure can result in a varying degree of cure of the epoxide network 713 relative to the methacylate network 710, as shown in FIG. 7C. By formulating the methacrylate and epoxide resins to have different resistance to a specific solvent, the partial UV and green cure shown in FIG. 7C can be used to tailor the resistance of the material of the final part 110 to the solvent. The formulation, cure process, and example results on solvent resistance are described herein, in combination with the knowledge of those skilled in the art.

Figure 8:
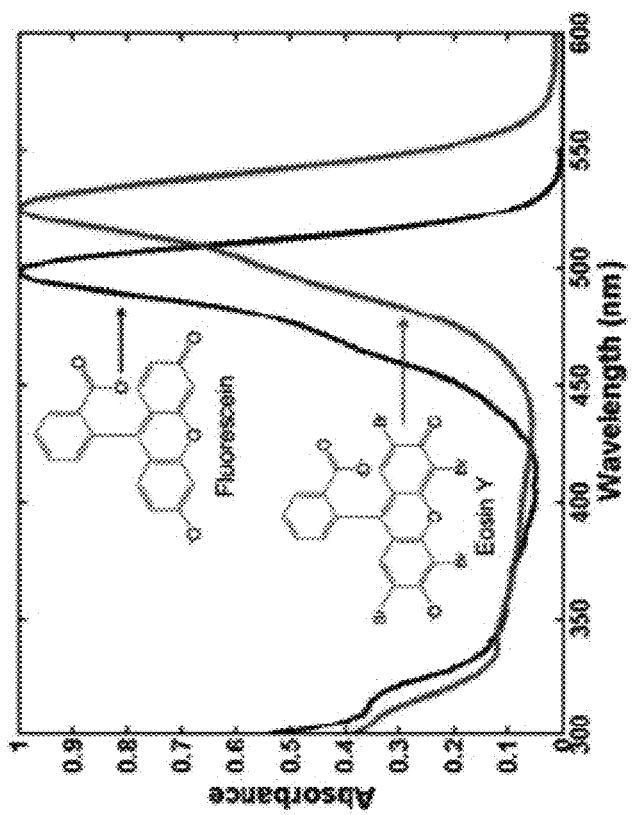
FIG. 8 is a graph of the absorption spectrum of a free-radical photoinitiator.

Example components of the resin for use in the dual core process include:

(1) A free-radical photoinitiator that can be activated by green light (e.g., approximately in the range of about 500 nm to about 530 nm), and cures methacrylate monomers. For instance, the photoinitiator composition can be approximately in the range of about 0.1 nM to about 0.5 mM Eosin Y in triethanolamine. The example absorption spectrum of Eosin-Y is shown in FIG. 8. The ratio of the photoinitiator to monomer mass can be between about 1% and about 10%.

(2) Methacrylate oligomers and monomers, such as trimethylolpropane triacrylate, and diluents like 2-hydroxyethyl methacrylate.

Figure 9:
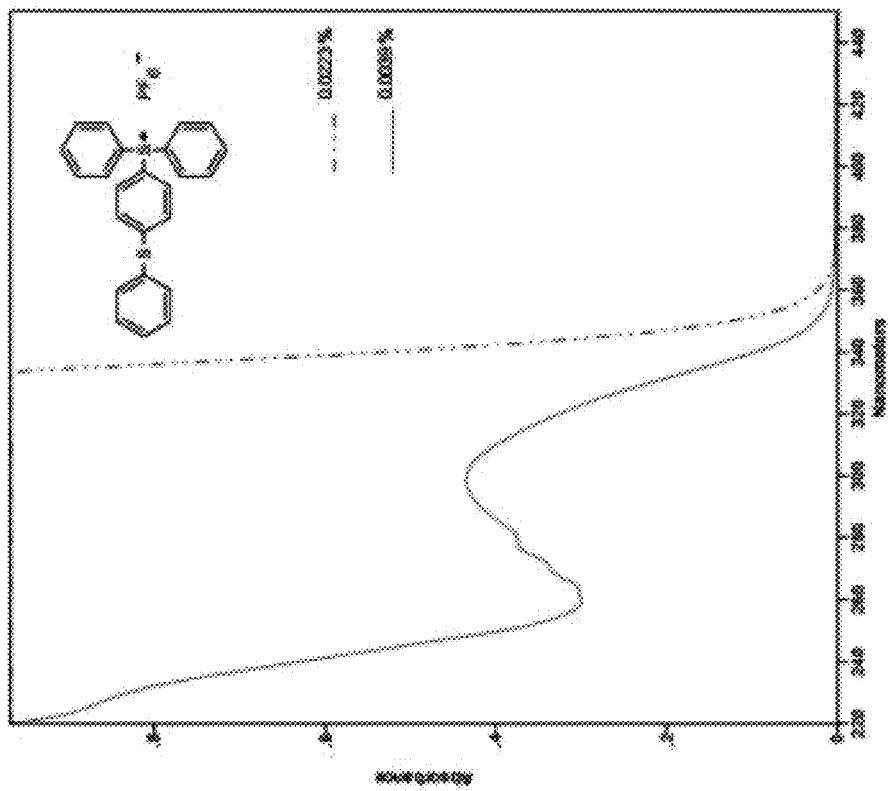
FIG. 9 is a graph of the absorption spectrum of a cationic photoinitiator.

(3) A cationic photoinitiator that is activated in the UV-B wavelength range (e.g., approximately in the range of about 280 nm to about 320 nm), such as triarylsulfonium hexafluorophosphate salts (about 50% in propylene carbonate). The absorption spectrum of the cationic initiator is shown in FIG. 9.

(4) Epoxide monomers such as bisphenol-A-(co-epichlorohydrin) diglycidyl ether and 3,4-epoxycyclohexylmethayl 3,4-epoxycyclohexanecarboxylate.

Additionally, the dual cure resin can be formulated with ratios of methacrylate to epoxide monomers approximately in the range of about 10% to about 50%. Moreover, other resins and resin combinations are considered, and the examples provided above are not intended to be limiting in any way beyond being merely representative of materials suitable for use with the systems and methods disclosed herein.

Figure 11:
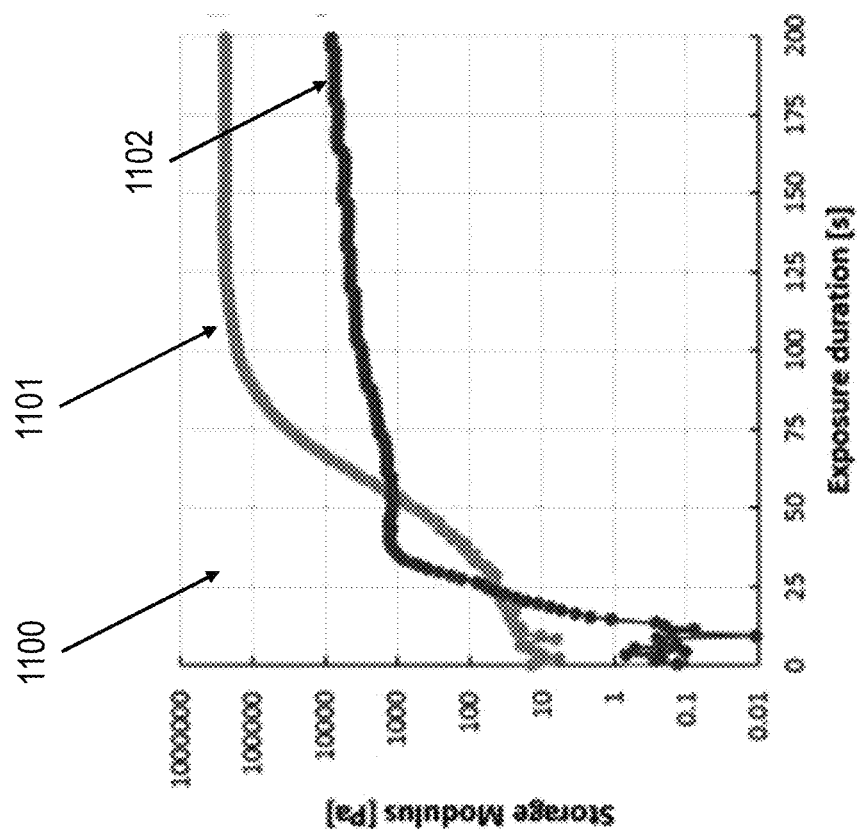
FIG. 11 is a graph of storage modulus vs. exposure duration illustrating cure profiles for UV curing of epoxide monomers and green light curing of methacrylate monomers according to embodiments of the present disclosure.
Figure 10:
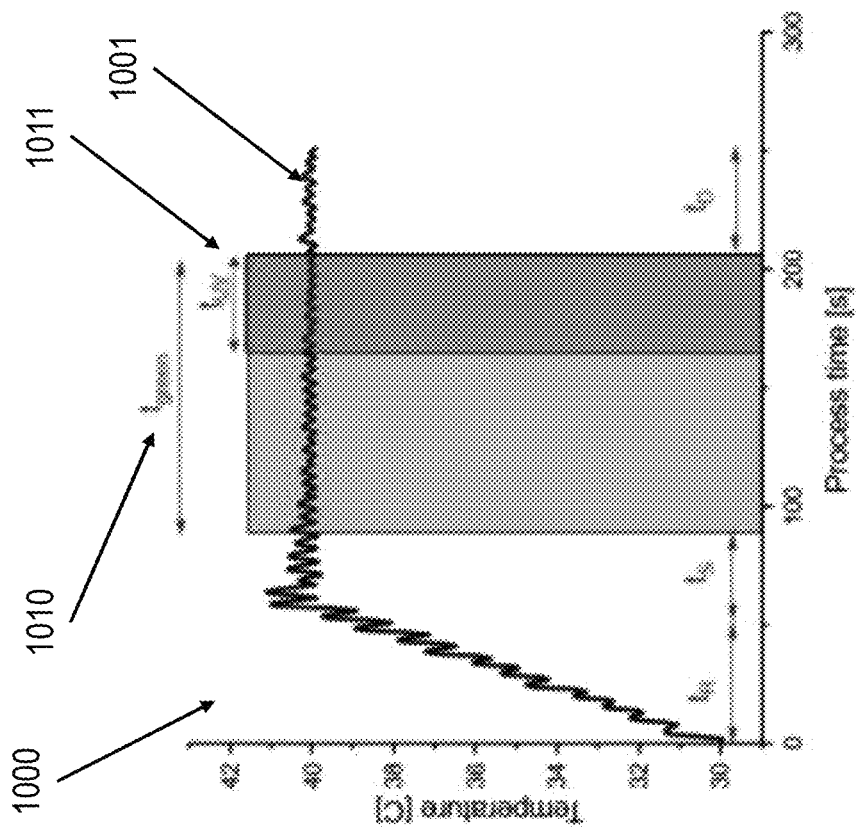
FIG. 10 is a graph of temperature vs. process time illustrating one exemplary embodiment of a cure schedule for dual-cure resins provided for herein.

An example dual cure process is shown in FIG. 10, which provides a graph 1000 of cure temperature over process time, as well as bars indicating periods of UV and green light exposure. FIG. 10 shows that a constant cure temperature 1001 can be maintained throughout the process. Green light exposure 1010 can take place throughout the exposure duration, with a UV fractional duration of the exposure being adjusted between about 0 and about 1. The UV cure duration 1011 can be scheduled such that it begins after a delay, as determined by the UV cure fraction. In this manner, the methacrylate monomers can be fully cured, whereas the degree of cure of the epoxide can be adjusted based, at least in part, on the UV cure duration 1011. Representative cure profiles of the epoxide monomers curing under UV light and the methacrylate monomers curing under green light are shown in FIG. 11. FIG. 11 is a graph 1100 of the cure profiles for UV curing of the epoxide monomers 1101 and green light curing of themethacrylate monomers 1102. The hybrid resins can include a mixture of these two components. Additionally, the reaction can be accelerated by increasing the intensity of light, and curing at slightly elevated temperatures (approximately in the range of about 40 C to about 60 C).

Testing of Resins for Dual-Cure Embodiments

Figure 12:
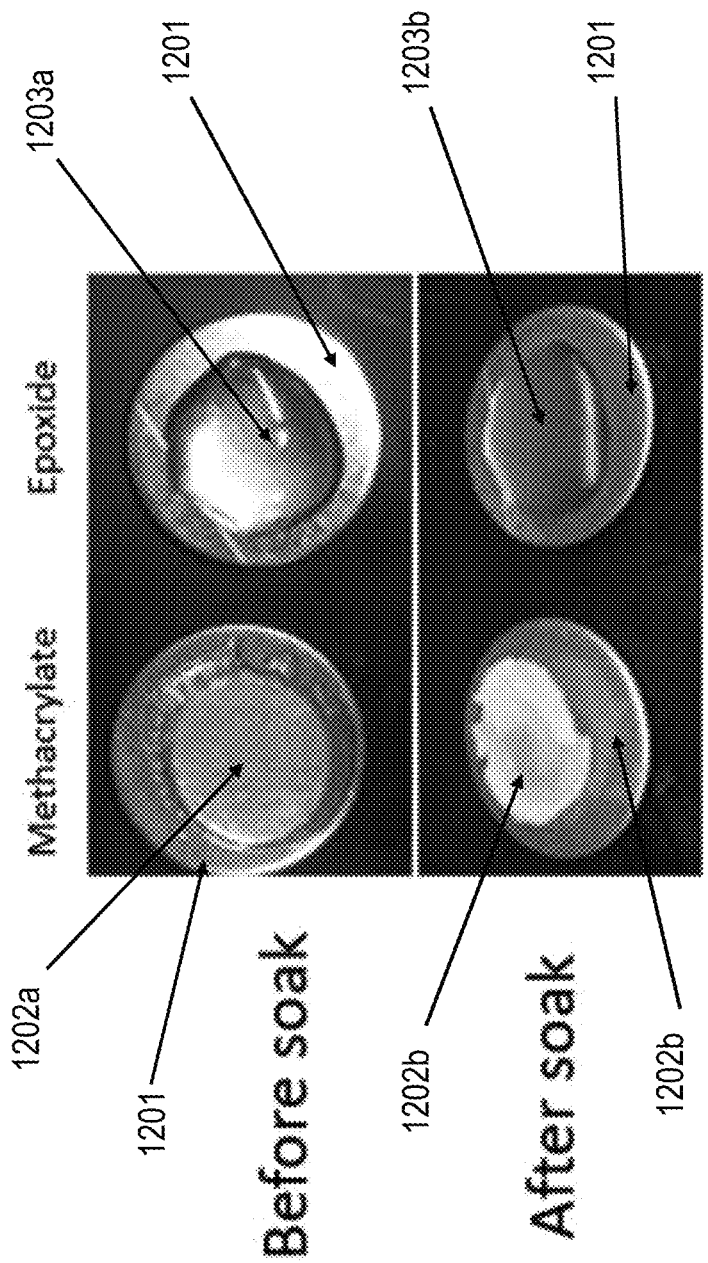
FIG. 12 are photographs of a baseline solvent resistance measurement for pure methacrylate and pure epoxide samples before and after soaking in a solvent according to embodiments of the present disclosure.

In order to examine the differing solvent resistance of the cured methacrylate and epoxide polymers, control samples of pure methacrylate 1202a and pure epoxide 1203a were each cured on stainless steel substrates 1201, as shown in the photographs of FIG. 12. The samples of pure methacrylate 1202a and pure epoxide 1203a were each cured using the same cure profile of about a 120 second exposure with UV cure fraction of about 1. FIG. 12 illustrates the samples before soaking and then after soaking. More particularly, the sample 1202a of pure methacrylate and the sample 1203 a of pure epoxide were immersed in carbon tetrachloride for approximately 8 hours. As shown in FIG. 12, the post-soaking methacrylate polymer sample 1202b swelled significantly and degraded completely upon drying, whereas the post-soaking epoxide sample 1203b was largely unaffected. These results established a baseline for formulation and solvent resistance tests of hybrid resin samples in view of the present disclsoures. In view of these disclosures, when two materials are used in which one selectively swells more than the other, such features can be utilized to create interfaces that separate more easily. For example, one material may have a higher resistance to swelling than the other.

Figure 13:
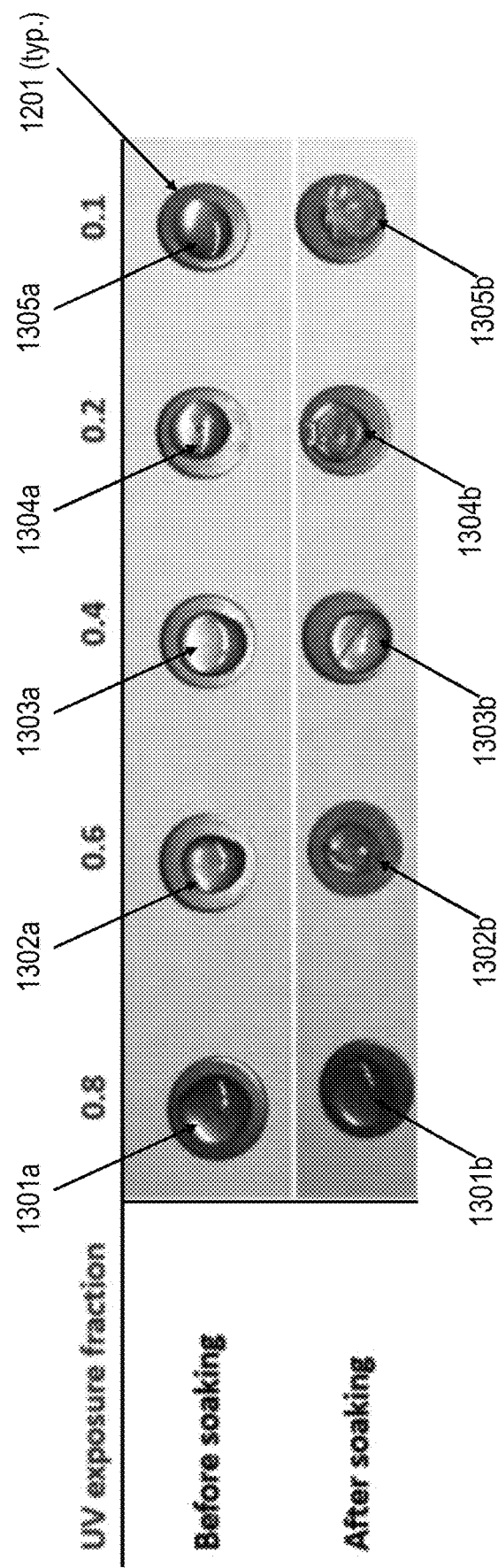
FIG. 13 are photographs of a plurality of samples prepared using varying cure schedules from a dual-cure resin before and after soaking in carbon tetrachloride according to embodiments of the present disclosure.
Figure 14:
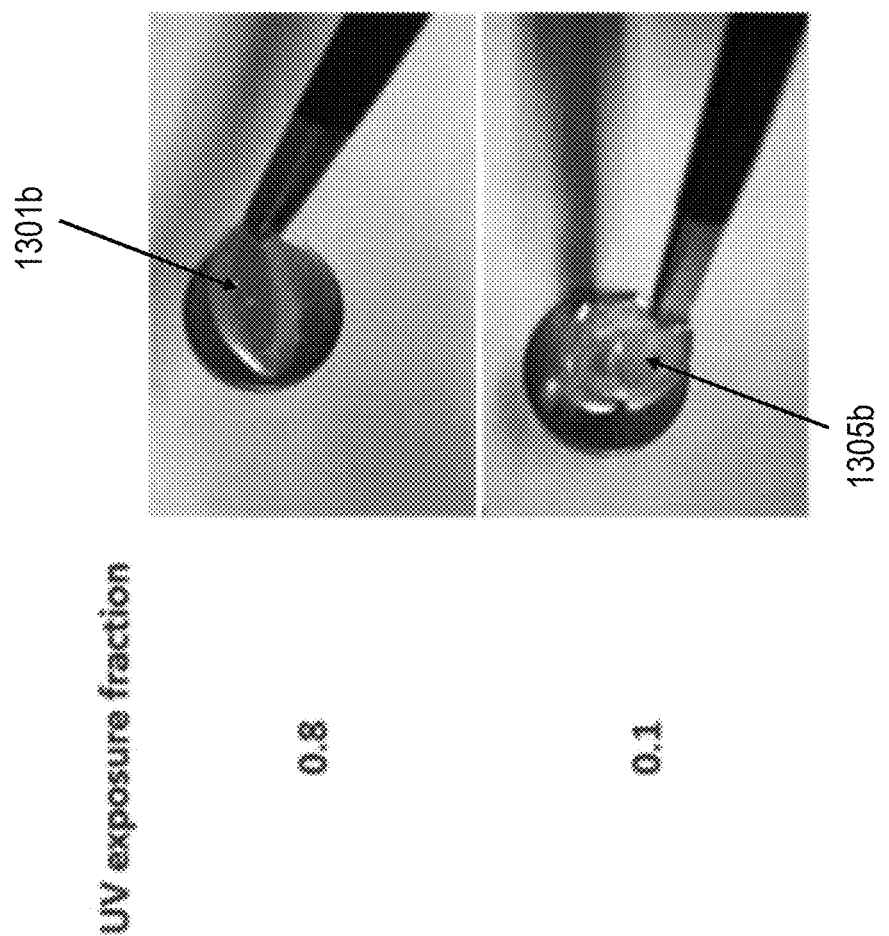
FIG. 14 is a are photographs of two of the samples of FIG. 13 showing detachment from the substrates after soaking.

FIG. 13 shows photographs of the results of dual-cure resin samples 1301a, 1302a, 1303a, 1304a, and 1305a each comprising approximately 55% methacrylate monomers and approximately 45% epoxide monomers, the samples being subjected to varying cure schedules before and after soaking in carbon tetrachloride. For the pre-soaking samples 1301a-1305a shown in FIG. 13, the total exposure duration was approximately 120 seconds, and the UV exposure fraction was varied approximately in the range of about 0.8 to about 0.1, corresponding to a variation from about 96 seconds to about 12 seconds of UV exposure, for a fixed green exposure of about 120 seconds. The samples 1301a-1305a were cured onto stainless steel substrates 1201 and washed with isopropyl alcohol immediately after curing to remove excess resin. The samples 1301a-1305a were then immersed in carbon tetrachloride for about 8 hours. The post-soaking samples, illustrated as 1301b, 1302b, 1303b, 1304b, and 1305b, were then extracted and photographed without any further post-processing. For a large UV exposure fraction, the epoxide monomers of the samples 1301b-1305b are cured to a greater extent, conferring resistance to carbon tetrachloride. As a result, each sample 1301b-1305b maintains its shape and mechanical integrity after soaking in carbon tetrachloride. By comparison for low UV exposure fractions, the 0.1 sample 1305b is severely degraded after soaking and the 0.2 sample 1304b shows significant cracking and warping. Intermediate degrees of UV exposure show progressive levels of degradation after soaking. Another detail is that all samples 1301b-1305b detached from the substrates 1201 after soaking, as shown in the photograph of FIG. 14 of the freestanding samples 1301b, 1305b, corresponding to a UV exposure fraction of about 0.8 and about 0.1, respectively. This detachment can address the problem of cleaning the build platform after printing, which often has to be scraped manually, resulting in scratching of the build platform surface and damage to the parts.

One skilled in the art will appreciate further features and advantages of the disclosures based on the provided for descriptions and embodiments. Accordingly, the inventions are not to be limited by what has been particularly shown and described. All publications and references cited herein are expressly incorporated herein by reference in their entirety.

What is claimed is:

1. A method for manufacturing a three-dimensional object, comprising:
    depositing a photopolymerizable material to form a desired three-dimensional object and to form a support structure configured to support the desired three-dimensional object, the deposited material forming one or more interfaces between the desired three-dimensional object and the support structure, the one or more interfaces being one or more locations at which the desired three-dimensional object is configured to be separated from the support structure;
    modulating material properties of the one or more interfaces such that an application of a threshold force proximate to or at the one or more interfaces allows the desired three-dimensional object to be separated from the support structure, a value of the threshold force being less than a value of a fracture force at which the desired three-dimensional object fractures;

at least partially curing at least a portion of the deposited material proximate to or at the one or more interfaces using light from a light source; and wherein modulating material properties of the one or more interfaces further comprises selectively lowering a tensile strength of the one or more interfaces relative to the object or decreasing a ductility of the one or more interfaces relative to the object by at least one of: (a) adjusting an intensity of exposure of the deposited material proximate to or at the one or more interfaces to the light from the light source or (b) adjusting a spatial distribution of exposure of the deposited material proximate to or at the one or more interfaces to the light from the light source, wherein modulating material properties of the one or more interfaces comprises generating residual polymerization stress at the one or more interfaces by adjusting the intensity of exposure or the spatial distribution of exposure at the one or more interfaces.

2. The method of claim 1, wherein generating residual polymerization stress at the one or more interfaces comprises adjusting the spatial distribution of exposure at the one or more interfaces by changing a scan pattern of the light source at the one or more interfaces relative to a scan pattern of the light source at the deposited material of the object.

3. The method of claim 2, wherein changing the scan pattern of the light source at the one or more interfaces relative to the scan pattern of the light source at the deposited material of the object comprises changing between (1) a cross-hatching pattern and (2) a vector scan pattern or sequential line-by-line scan pattern.

4. The method of claim 1, further comprising both adjusting the intensity of exposure of the deposited material and adjusting the spatial distribution of exposure of the deposited material.

5. The method of claim 1, wherein at least partially curing at least a portion of the deposited material proximate to or at the one or more interfaces using a light from a light source is performed prior to separating the desired three-dimensional object from the support structure at the one or more interfaces.

6. The method of claim 1, further comprising forming a notched geometry at one or more of the one or more interfaces, the notched geometry being configured to promote separation between the desired three-dimensional object and the support structure.

7. The method of claim 1,
further comprising modulating properties of a plurality of the one or more interfaces in a manner that directs a separation path to be followed when separating the desired three-dimensional object from the support structure, and wherein separating the desired three-dimensional object from the support structure further comprises separating the desired three-dimensional object from the support structure along the separation path.

8. The method of claim 1, further comprising separating the desired three-dimensional object from the support structure at the one or more interfaces without the assistance of a separation tool to separate the desired three-dimensional object from the support structure.

9. The method of claim 1, wherein the deposited material that forms the desired three-dimensional object, the support structure, and the one or more interfaces is the same material for each of the desired three-dimensional object, the support structure, and the one or more interfaces.

10. The method of claim 1, further comprising:
obtaining a design for a three-dimensional geometry to form the desired three-dimensional object;
generating a design for the support structure based on the design for the three-dimensional geometry; and
generating a scan pattern to build the designed support structure on a layer-by-layer basis.

11. The method of claim 1, further comprising:
adding one or more layers of digital data for the one or more locations proximate to or at the one or more interfaces,
wherein modulating properties of the one or more interfaces further comprises modifying print instructions for forming the one or more interfaces to change one or more material properties of the material within the one or more layers relative to properties achieved by forming the desired three-dimensional object and the support structure.

12. The method of claim 1, wherein at least partially curing at least a portion of the deposited material proximate to or at the one or more interfaces comprises a perimeter scan and an infill scan, each of the perimeter and infill scans using light from the light source, and wherein adjusting the intensity and/or spatial distribution of exposure of the deposited material proximate to or at the one or more interface is conducted during the infill scan,
wherein the infill scan of the deposited material is conducted after the perimeter scan of the deposited material.

13. The method of claim 1, wherein generating residual polymerization stress at the one or more interfaces comprises controlling a dosage of exposure of the deposited material at the one or more interfaces to light from the light source to maximizing build-up of the residual polymerization stress at the one or more interfaces.

* * * * *